United States Patent [19]

Kahle

[11] Patent Number: 5,191,485
[45] Date of Patent: Mar. 2, 1993

[54] PRISM FOR IMAGE ROTATION

[75] Inventor: Todd A. Kahle, Hartford, Wis.

[73] Assignee: Infographix, Inc., Sussex, Wis.

[21] Appl. No.: 762,719

[22] Filed: Sep. 19, 1991

[51] Int. Cl.⁵ .......................... G02B 5/04; G03B 21/11
[52] U.S. Cl. ........................................ 359/834; 355/45
[58] Field of Search ........ 359/834, 831, 833, 835–837, 359/737; 355/45

[56] References Cited

U.S. PATENT DOCUMENTS

| | | | |
|---|---|---|---|
| 2,678,580 | 5/1954 | Erbah | 359/834 |
| 2,780,142 | 2/1957 | Bouwers | 359/831 |
| 3,049,972 | 8/1962 | Malinewski | 359/835 |
| 3,481,901 | 12/1969 | Melech | 350/203 |
| 3,614,448 | 10/1971 | Di Prose et al. | 359/834 |
| 3,724,927 | 4/1973 | Cox | 350/203 |
| 4,514,050 | 4/1985 | Stites | 350/444 |
| 4,529,276 | 7/1985 | Yamada | 350/445 |
| 4,659,155 | 9/1987 | Ishii et al. | 355/45 |
| 4,948,228 | 8/1990 | Keens | 359/834 |

FOREIGN PATENT DOCUMENTS

| | | | |
|---|---|---|---|
| 32339 | 3/1977 | Japan | 359/834 |
| 288348 | 7/1969 | U.S.S.R. | 359/834 |

OTHER PUBLICATIONS

"Prisms and Mirrors", *Modern Optical Engineering*, Chapter 4, Warren J. Smith, McGraw-Hill Book Company, 1966.

*Primary Examiner*—Jon W. Henry
*Attorney, Agent, or Firm*—Quarles & Brady

[57] ABSTRACT

An assembly for rotating an image formed by a group of light rays has a first prism with a transparent first facet through which the light rays enter. The image light rays entering the first facet strike a second facet at angles of incidence greater than the critical angle and are reflected toward a third facet. The third facet is silvered to reflect substantially all of the image light rays back toward the second facet so that the light rays strike the second facet at less than the critical angle and exit the first prism. A second prism is spaced from the first prism to receive light rays from second facet. After entering the second prism, such light rays strike one of its facets and are reflected toward and through an exit facet. The facets of the second prism are angled to minimize image distortion and compensate for lateral offset of the light rays exiting the assembly. A version of the assembly is described in which the second prism is replaced by a mirror.

20 Claims, 4 Drawing Sheets

PRISM FOR IMAGE ROTATION

BACKGROUND OF THE INVENTION

The present invention relates to optical prisms which when rotated cause a rotation of an image being projected through the prism; and more particularly to such prisms for use in an image projection system for a microfilm viewer/printer.

Microfilm is commonly used for archival storage of large volumes of documents. Viewing equipment is necessary for a user to read documents stored on microfilm and printers are required to make an enlarged paper copy of such documents. Consequently, machines which perform both functions, commonly referred to as microfilm viewer/printers, are commercially available and widespread. Such microfilm viewer/printers have one mode in which the microfilmed image is projected onto a screen for observation by the user. If the user desires a paper copy of the projected image, a button on the machine is depressed and the image is directed toward a electro-photographic copying apparatus inside the machine.

The recording medium is referred to herein generically as microfilm, a term which includes a long strip of a photographic transparency much like motion picture film in which the different documents are recorded at sites along the length of the strip. Such long strips of microfilm are stored on reels. Another microfilm medium, commonly referred to as microfiche, is a flat, rectangular photographic transparency containing rows and columns of sites for the microfilm images. In both forms, the microfilm site is rectangular in which the length of the site is longer than the width in a proportion that conforms to the proportions of standard sizes of printed documents.

Most documents have lines of text extending across the smaller dimension of the page. However, computer printouts commonly have lines of text extending along the longer dimension of the page. Thus, when both types of documents are microfilmed, the lines of text in a image from a computer printout are oriented orthogonally on the medium to the orientation of the lines of text from standard documents.

In order to accommodate the display of both types of documents, microfilm viewers previously provided a film holder which could be rotated into two orthogonal viewing positions. Thus the viewer could orient the medium so that the lines of text appeared horizontally on the viewing screen. In one orientation, the longer dimension of the paper was projected vertically on the screen for viewing standard documents and in the other orientation, the longer dimension was projected horizontally for reading computer printouts.

However, the printing mechanism for creating paper copies was often mounted in the viewer/printer in a fixed orientation to the screen. One type of view/printer was designed to accommodate computer printouts by orienting the printer to copy documents being displayed with the longer dimension projected horizontally on the screen. Thus in order to print standard documents recorded on microfilm, the user had to rotate the film holder to project the lines of text vertically on the screen before pressing the print button. Alternatively, the view/printer could be designed with the printing mechanism oriented for standard documents. While this system facilitates processing standard documents recorded on microfilm, the film holder still must be rotated between viewing and printing computer printouts.

Although motorized mechanisms could be developed for automatically rotating the film holder between the viewing and printing modes, such mechanisms increase the size of the microfilm apparatus. The motorized mechanisms also present a safety hazard as the user is typically holding onto the film holder in order to advance the microfilm from one image to the next. Thus, the user's hands could be struck or pinched by the automatically rotating film holder.

As an alternative to rotating the film holder, previous microfilm viewer/printers utilized a Dove prism, as shown in FIG. 1, through which the light was projected from the microfilm medium to either the screen or the printing apparatus. When this type of prism is rotated, the projected image also rotates even though the optical object remains stationary. By rotating the Dove prism between the viewing and printing modes, the image of the document is rotated into one orientation for reading by the viewer and into another orientation to fit onto a sheet of paper within the printing apparatus. Furthermore, since the Dove prism and its associated components are inside the viewer/printer, the user can not come into contact with the rotating mechanism.

FIG. 2 shows a reversion prism which exhibits similar image rotation properties as a Dove prism. The reversion prism is formed by two pieces of optical glass for ease of fabrication. The pieces abut one another so that light passing through the prism is not refracted or reflected at their interface. One of the reflective surfaces 8 of a reversion prism is coated with silver or other reflecting material to reflect the light back into the prism. The axial light ray 9 enters and exits the reversion prism on the rotation axis of the prism.

The use of Dove prisms in microfilm viewers/printers present several problems. First, the prisms change the effective focal length of the lens system as the light rays diverge less in the prism than in air. Therefore, if a manufacturer produces two models of a microfilm viewer/printer, with and without the rotating prism but otherwise the same, different focal length lenses are required in each model to achieve the same magnification. This not only increases manufacturing costs, but requires the stocking of both types of lenses for maintenance and repair purposes. Secondly, the Dove prism has a relatively long length affecting the ability to reduce the size of the microfilm viewer/printer to make it as compact as possible. It is desirable in today's marketplace to have a compact device which can fit on a table top and be transported easily.

SUMMARY OF THE INVENTION

A prism assembly can be rotated to rotate an image formed by a group of light rays travelling from a fixed source to a projection surface. The assembly has a first prism with a transparent first facet through which the light rays enter from the source. A second facet is angled with respect to the first facet so that the light rays entering through the first facet strike the second facet at an angles of incidence that are equal to or greater than the critical angle. Because of this angle and a different refractive index material outside the second facet, each light ray is reflected into the first prism toward a third facet. The third facet preferably is silvered so that substantially all of the light rays received from the second facet are reflected internally to strike the second facet again, but at less than the critical angle. Therefore, these light rays striking the second facet again will exit the first prism.

The light rays exiting said first prism through the second facet strike a reflective means which redirects the rays along a desired projection path. In the preferred embodiment, the reflective means is a second prism having a fourth facet which is spaced from the second facet to receive light rays from said first prism. The space between the prisms is filled with a substance, such as air, that has a refractive index which is different from refractive indices of the first and second prisms. The second prism has a fifth facet through which the light rays exit the second prism and a sixth facet is located to reflect light rays received from the fourth facet toward the fifth facet. Ideally the fifth facet is cut at an angle so that the axial light ray of the group exits the second prism perpendicular to the fifth facet.

Another embodiment is described in which a mirror is used as the reflective means that redirects the light rays exiting said first prism.

The prism assembly produces a transverse offset between the path of the light rays entering and exiting the assembly. In order to correct for this offset, the sixth facet or the mirror may be angled to project the center of the image at a point on the projection surface at which the image would be centered if the offset did not occur.

A general object of the present invention is to provide an image rotating prism assembly which is shorter than conventional Dove and reversion prisms.

DETAILED DESCRIPTION OF THE INVENTION

The present image rotating prism is being described in the context of its use in a microfilm viewer/printer. However, those skilled in the art will immediately appreciate that this type of prism has application in other image projection systems.

Figure 3:
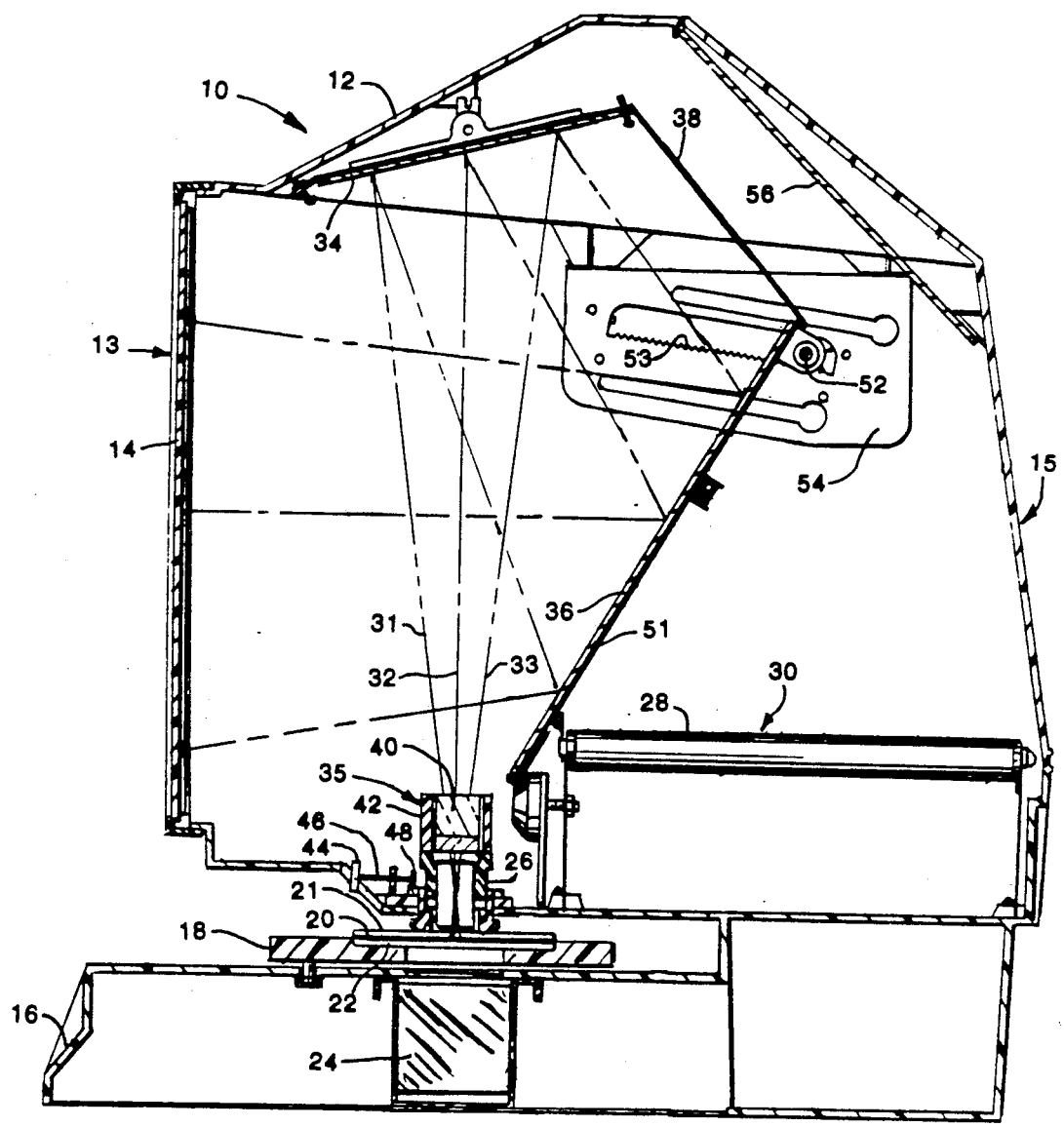
FIG. 3 is a cross section view of a microfilm viewer/printer in the viewing mode.

Referring to FIG. 3, a microfilm viewer/printer 10 includes a housing 12 which has a screen 14 in a generally vertical viewing plane, a control panel 16 and a microfilm carrier 18. The viewer/printer 10 is placed on a desk or counter top with the user facing the front 13 of the housing to operate the carrier and the control panel. A sheet of microfilm 20 containing document images is placed between two flat glass plates 21 and 22 on carrier 18 which hold the microfilm 20 in the object plane of the apparatus. Beneath the carrier 18 is a light source 24 which provides a vertical upwardly-directed converging ray of light passing through an opening in the carrier 18 and through the glass plates 21, 22 and the microfilm sheet 20. Carrier 18 is moved horizontally to place the recorded document desired to be viewed at a position in which it is projected onto viewing screen 14. Although in the preferred embodiment a carrier 18 for microfilm sheets is employed, it should be understood that the principle of the invention can be applied to other forms of microfilm, such as strips stored on reels.

A focusing lens 26 is provided directly above the carrier 18 to focus the microfilm image in an image area of the object plane onto the screen 14. In the viewing mode illustrated in FIG. 3, the lens 26 projects the microfilm image formed by a group of light rays 31, 32 and 33, depicted by broken lines in the drawing, through a prism assembly 35 onto a first mirror 34. Light ray 32 is referred to as the "axial light ray", since it travels along the optical axis through the focusing lens 26. It is understood that many more light rays, than just the three illustrated, actually form an image.

The first mirror 34 is pivotally mounted near the top of housing 12. The document image is reflected by the first mirror 34 onto a second mirror 36 which is connected to the first mirror by a elastic strap 38. The light rays 31-33 of the image are reflected by the second mirror 36 onto the screen 14. The first and second mirrors 34 and 36 are preferably high quality optical elements having a reflectivity of approximately ninety percent or greater. Substantially all of the light impinging upon these mirrors is reflected.

The second mirror 36 is held in a mounting plate 51 which pivots about a shaft 52. A gear (not shown) is attached at each end of the shaft 52 and engages teeth 53 in a fixed mounting bracket 54. The shaft 52 is driven by a motor which is not visible in the drawings. When the motor rotates the shaft 52, the gears move along teeth 53 causing the bracket 51 and second mirror 36 to move forward and backward. The extreme backward position of the second mirror 36 is shown in FIG. 3 at which the mirror is located in the viewing mode.

Figure 4:
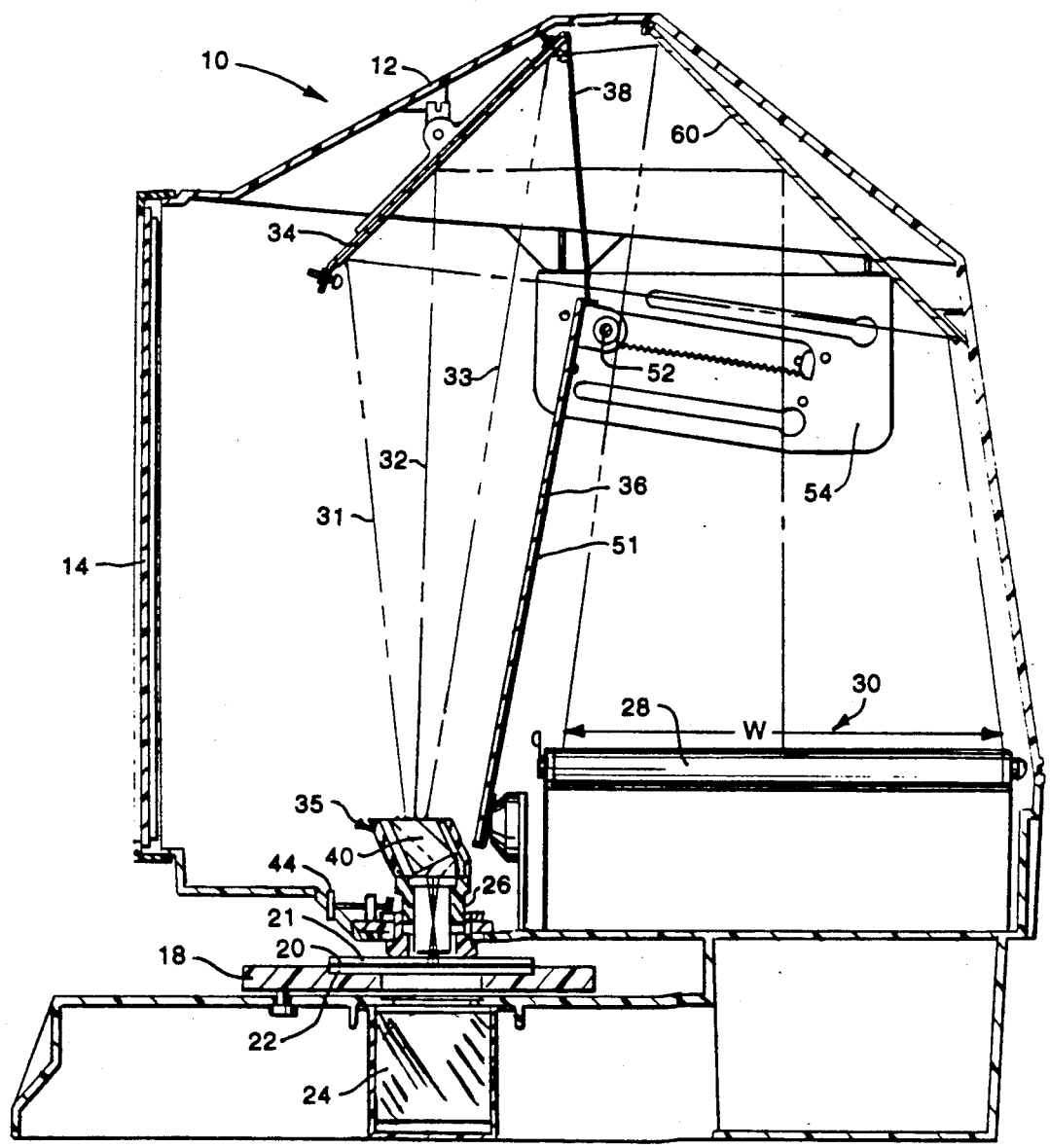
FIG. 4 is a similar cross sectional view of the microfilm viewer/printer in the printing mode.

The extreme forward position is illustrated in FIG. 4 at which the second mirror 36 is positioned in the printing mode. In this forward position, the elastic strap 38 allows the first mirror 34 to drop into a different orientation than in the viewing mode. When the first and second mirrors are in the positions illustrated in FIG. 4, light rays 31, 32 and 33 of the image are reflected by the first mirror 34 toward the back of the viewer/printer 10 onto a third mirror 56. This latter mirror 56 reflects the light rays downward onto the surface of a photoreceptor 28 in an electro-photographic copying apparatus 30. The light rays travel the same distance to the screen 14 and photoreceptor 28 so that the projected image remains in focus on both surfaces.

Any suitable electro-photographic copying apparatus 30 may be employed in the viewer/printer 10. However, to fully realize the advantages afforded by the invention, the copying apparatus should be a plain paper type copying system capable of "full plane" exposure. A plain paper system uses a photoreceptor with a re-usable photoconductor element that is charged and exposed to the projected document image, thereby producing a latent electro-static image on the photoreceptor. The latent electro static image formed on the photoreceptor is developed subsequently using fine developer particles which in turn are transferred to a sheet of paper and fused to the paper to make a copy. In the embodiment illustrated, a belt type photoreceptor 28 is employed by the electro-static copying apparatus 30.

Individual sheets of standard size (e.g. 8.5 inch by 11 inch) paper are stacked within the copying apparatus 30. Such sheets of paper can be utilized to produce copies of standard letter sized documents or a slightly reduced version of 11 inch by 14 inch computer printouts which have been recorded on the microfilm 20. The sheets of paper are fed so that their 8.5 inch dimension extends across the width W of the photoreceptor 28. Therefore, the width of the document image should be projected across the width W of the photoreceptor 28 for maximum enlargement.

As is evident from FIG. 3 and 4, when a standard document with lines of text running across the width of the page is printed, the lines are projected onto the photoreceptor 28 front to back within the housing 12. However, when the document is projected for viewing, the lines of text should extend horizontally on screen 14, i.e. into the plane of the drawings. Thus, the lines of text in these two projections are orthogonal to each other.

The prism assembly 35 provides a mechanism for rotating the image of the document for proper projection in the viewing and printing modes. This assembly 35 includes a compound prism 40 mounted in a holder 42 that is attached to the focusing lens 26. The prism assembly 35 and the focusing lens 26 are mounted above the microfilm carrier 18 and are rotatable about the optical axis of the lens. A knob 44 extends through an opening in the housing 12 and is attached to one end of a shaft 46. A wheel 48 is connected to the other end of the shaft 46 and contacts the prism and lens combination. By rotating the knob 44, the user can rotate the prism assembly 35 about a vertical axis.

Figure 1:
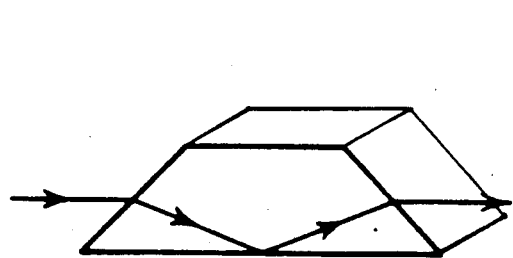
FIG. 1 is a perspective view of a Dove prism known in the prior art for the ability to rotate images.
Figure 2:
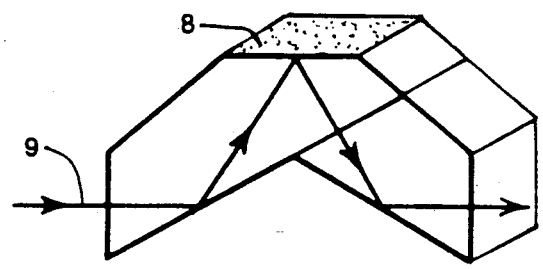
FIG. 2 is a perspective view of a reversion prism also known in the prior art for the ability to rotate images.
Figure 5:
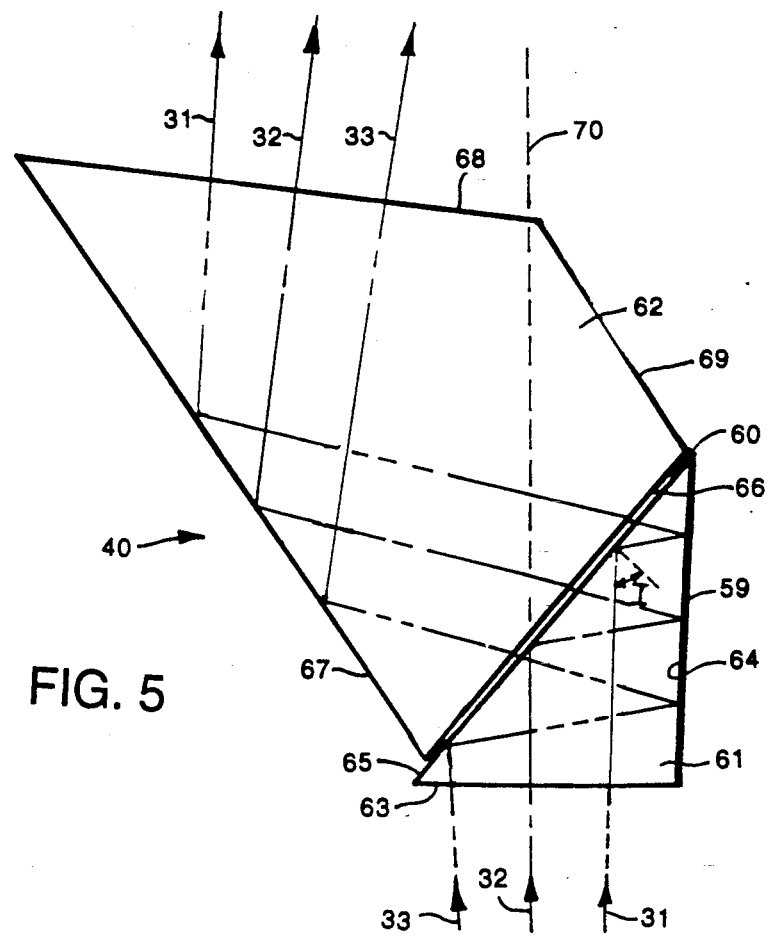
FIG. 5 is a schematic illustration of a prism assembly according to the present invention which is utilized in the apparatus illustrated in FIGS. 3 and 4.

Referring to FIG. 5, the compound prism 40 is formed by two individual prisms 61 and 62 of optical quality glass having a refractive index of 1.728, for example. The first prism 61 is a right-angle pentahedron having an entrance facet 63, a side facet 64 orthogonal to the entrance facet, and a hypotenuse facet 65. The second prism 62 is a hexahedron having a first facet 66, a base facet 67 abutting the first facet and an exit facet 68 opposite the first facet. Preferably, the second prism is a trapezoidal hexahedron with parallel facets 67 and 69. As is common practice, some of the insignificant corners of both prisms 61 and 62 can be truncated to reduce the size and weight of the prism. Although the prisms 61 and 62 with truncated corners geometrically are not a true pentahedron and hexahedron respectively, such variations of the prisms are functionally equivalent to a pentahedron and hexahedron.

The first facet 66 of the second prism 62 is parallel to and spaced from the hypotenuse facet 65 of the first prism 61 to create an air gap therebetween. The spacing between the two prisms 61 and 62 is about 0.002 inches, for example. The spacing must be great enough that substantially all the light within the first prism 61 that strikes the hypotenuse facet 65 at an angle of incidence equal to the "critical angle" will be reflected. However, if the spacing is too great, significant chromatic separation will occur later when the light travels through the spacing. By maintaining the spacing relatively small the chromatic distortion caused by refraction of the light upon entering the air gap will be minimized. The two prisms 61 and 62 are attached by double sided adhesive tape 60 placed near opposite edges of the hypotenuse facet 65 between that facet and facet 66 of the second prism. Although using tape 60 to attach the prisms has the advantage of inherently defining the space between the prisms, other means of attachment can be used.

The axial light ray 32 from the focusing lens 26 intersects entrance facet 63 of the first prism 61 perpendicularly at the rotational axis 70 of the prism assembly 35. Such perpendicular relationship not only reduces reflection, but also minimizes astigmatic and chromatic distortion. Although the perpendicular intersection of the axial light ray 32 and the entrance facet 63 are preferred for this reason, a non-perpendicular intersection is permissible where the resultant distortion can be tolerated. The light rays 31-33 travel through the first prism 61 striking the hypotenuse facet 65. The hypotenuse facet is cut at an angle so that the light rays strike at angles of incidence which are at least equal to the critical angle. The critical angle for the prism glass having the stated refractive index is approximately 35.4 degrees. The angle of incidence plus the different refractive index of the air in the space between the two prisms 61 and 62 cause the light rays to be reflected inside the first prism 61 toward the side facet 64.

The side facet 64 is silvered reflect the light rays 31-32 back toward the hypotenuse facet 65. The reflective silver coating 59 is necessary as the light rays strike the side facet at less than the critical angle. The light rays 31-33 then impinge the hypotenuse facet 65 at angles of incidence which are less than the critical angle. Therefore, substantially all of the light now passes out of the first prism 61 through the hypotenuse facet. The region on the hypotenuse facet 65 where the light rays 31-33 travelling from the entrance facet 63 strike, overlaps another region on the hypotenuse facet where the light rays strike after being reflected by the side facet 64. By overlapping these regions, the height of the compound prism 40 is made shorter than previous image rotation prisms. For example, the height of compound prism 40 is approximately one quarter the height of an equivalent Dove prism.

The light then travels through the air gap between the two prisms entering the first facet 66 of the second prism 62. The light rays 31-33 strike the base facet 67 at angles of incidence that are greater than the critical angle so that substantially all of the light will be reflected inside the second prism 62. The rays of light then traverse upward through the second prism and out of the exit facet 68. The exit facet is cut at an angle so that the axial ray 32 will be perpendicular to the exit facet.

It should be noted that whereas light rays 31-33 enter the compound prism 40 centered about the rotational axis 70, they are offset laterally from the axis upon leaving the second prism 62. The axial ray 32 would continue travel from the focusing lens 26 along the rotation axis 70 if the prism assembly was not present. Because of this offset, the projected image normally would revolve about the center of the screen 14 as the prism assembly 35 is rotated. To prevent this movement of the projected image and keep it centered on both the screen 14 and the photoreceptor 28 in all rotational positions of the prism assembly 35, the base facet 67 is angled to reflect the light rays toward the rotational axis 70. The angle is chosen so that the axial ray 32 will strike the same locations on the screen 14 and the photoreceptor 28 regardless of the angular position of the prism assembly 35. Because of this angle, the axial ray 32 does not impinge the projection surface formed by either the screen 14 or photoreceptor 28 at a right angle. As a result, some of the light rays that form the document image will strike the projection surface before others. However, the image is not distorted significantly by this effect due to the relatively long (e.g. 33 inches) path between the second prism 62 and the projection surface 14 or 28.

Figure 6:
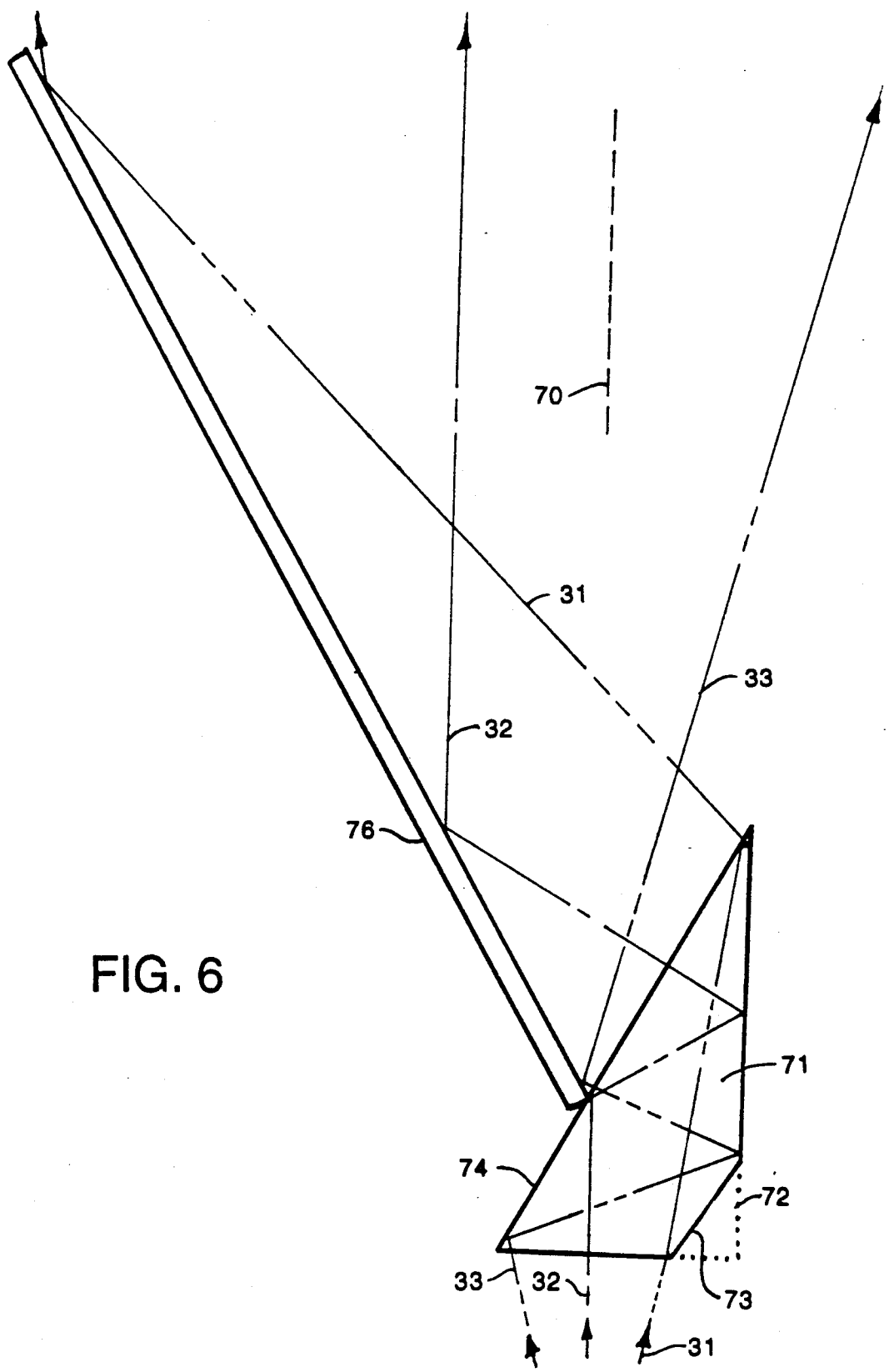
FIG. 6 is a schematic representation of an alternative prism assembly.

FIG. 6 illustrates an alternative embodiment of the prism assembly in which the second prism 62 is replaced by a mirror. This embodiment uses a pentahedral prism 71 with the right angle corner truncated as indicated by dotted lines 72 to create a sixth facet 73. The removal of the corner reduces the weight of the prism without altering its functionality. As noted above, prisms with such functionless portions removed are considered equivalent to the basic geometric solid, in this case a pentahedron.

Prism 71 is similar to the first prism 61 in FIG. 5 and the light rays travel through both optical elements in much the same manner. However, the prism 71 in FIG. 6 is slightly taller to enable the hypotenuse facet 74 to be angled so that the axial ray 32 exits perpendicularly through the facet.

A front reflective surface mirror 76 is held in the assembly to reflect the light rays 31-33 into similar paths as the light rays that exited the second prism 62 in FIG. 5. The combined height of the prism 71 and mirror 76 is more than twice that of compound prism 40 in the first embodiment. However, if this larger size can be tolerated, the second embodiment is less expensive because the mirror 76 is cheaper to fabricate than the second prism 62.

As described previously, conventional Dove prisms altered the focal length of the projection lens because the light rays diverge less in the prism than in air. However, the present compound prism 40 or combination of a prism 71 and mirror 76 do not appreciably alter the focal length of a viewer/printer without a prism assembly 35. As is apparent from FIGS. 3 and 4, the path of the light rays 31-33 through the glass is significantly longer than the height of the compound prism. This greater path length allows the light rays 31-33 to diverge approximately the same amount in the prism assembly 35 as the light rays diverge in a straight path through air, even though the rate of divergence is less in the glass than in air. Therefore, the same focusing lens 26 can be used in two models of the viewer/printer which provide the same level of magnification, but with and without an image rotating prism.

Referring to FIGS. 3 and 4, when conventional computer printouts recorded on microfilm are to be viewed and printed, the prism assembly 35 first is rotated into a position in which the lines of text on the computer document are projected horizontally on the screen 14. The user then manually positions the microfilm carrier 18 until the desired document is projected onto the screen 14. In this orientation, the image can be transferred directly onto the photoreceptor belt 28 for printing as the lines of text will be printed lengthwise on the paper. To print the document, the user depresses the print button on the control panel 16. While the prism assembly 35 remains in the same position, the first and second mirrors 34 and 36 move from the positions illustrated in FIG. 3 to those illustrated in FIG. 4. The copying apparatus 30 then is activated. After the photoreceptor 28 has been exposed the mirrors 34 and 36 return to the viewing mode positions.

When standard documents having lines of text running across the width of the page are being viewed and printed, the user rotates knob 44 to rotate the image projected on screen 44 until the lines of text are displayed horizontally. The prism assembly 35 is rotated forty-five degrees to produce a ninety degree rotation of the projected image while the microfilm 20 remains in the same position. In order to print a standard document, the image must be rotated to a position at which the lines of text are displayed vertically on the screen 14, in order to project the image properly onto the photoreceptor 28. Thus, before pressing the print button on panel 16, the user operates knob 44 to rotate the prism assembly 35 forty-five degrees and the image ninety degrees so that it will be properly projected onto the photoreceptor 28.

This rotation of the prism assembly 35 can be done automatically by the control circuitry within the viewer/printer 10. A document selector switch is provided on the control panel 16 for the user to indicate whether computer printouts or standard documents are being viewed. The selector switch causes the prism assembly 35 to be rotated by a motor for proper viewing of the document. A manual prism adjustment still is required to insure true orientation of the image and compensate for misregistration which occurred during document photographing. When the user presses the print button, the prism assembly 35 is automatically rotated, if required, as indicated by the position of the document selector switch. After the photoreceptor 28 has been exposed to the document image, the control circuitry within the viewer/printer 10 returns the mirrors 34 and 36 into the viewing position illustrated in FIG. 4 and, if necessary, the prism assembly 35 is rotated to properly project the document image onto screen 14.

The invention being claimed is:

1. An apparatus, which rotates a group of light rays when the apparatus is rotated about an axis, comprising:
   a first prism having a transparent first facet through which the light rays enter said prism with an axial light ray of the group entering the first facet along the axis, a transparent second facet at an angle with respect to the first facet such that the light rays strike the second facet at angles of incidence that are equal to or greater than the critical angle, and a third facet reflecting substantially all of the light rays received from the second facet internally toward the second facet so that the light rays strike the second facet at angles of incidence that are less than the critical angle; and
   means for reflecting light rays exiting said first prism through the second facet in which the axial light ray is reflected at a point that is offset from the axis, said means for reflecting being oriented to direct the axial light ray toward the axis.

2. The apparatus as recited in claim 1 further comprising a reflective coating applied to the third facet of said first prism.

3. The apparatus as recited in claim 1 wherein a region on the second facet where the light rays travelling from the first facet strike overlaps another region on the second facet where the light rays strike after being reflected by the third facet.

4. The apparatus as recited in claim 1 wherein said first prism is a pentahedron.

5. The apparatus as recited in claim 1 wherein the third facet is substantially orthogonal to the first facet.

6. The apparatus as recited in claim 1 wherein said means for reflecting comprises a second prism having a fourth facet which is spaced from the second facet to receive light rays from said first prism, a fifth facet permitting the light rays to exit said second prism, and a sixth facet positioned to reflect light rays received from the fourth facet in a direction toward the fifth facet.

7. The apparatus as recited in claim 6 wherein the fifth facet of said second prism is positioned such that the axial light ray passes perpendicularly through the fifth facet.

8. The apparatus as recited in claim 6 wherein said second prism is a hexahedron.

9. The apparatus as recited in claim 6 wherein the light rays strike the sixth facet at angles of incidence that are equal to or greater than the critical angle.

10. The apparatus as recited in claim 6 wherein said first and second prisms have substantially the same refractive indices.

11. The apparatus as recited in claim 10 wherein the space between said first and second prisms contains a substance with a refractive index that is different from the refractive indices of the first and second prisms.

12. In a system which projects an image onto a surface, an apparatus which when rotated about an axis produces a rotation of a group of light rays passing through the apparatus, said apparatus comprising:

a first prism having a transparent first facet intersecting the axis and through which the light rays enter said first prism with an axial light ray of the group entering the first facet along the axis, a transparent second facet at an angle with respect to the first facet such that the light rays strike the second facet at angels of incidence which are equal to or greater than the critical angle, and a third facet refection substantially all of the light rays received from the second facet internally toward the second facet so that the light rays strike the second facet another time at angles of incidence that are less than the critical angel and exit the first prism; and a second prism having a fourth facet intersecting the axis and spaced from the second facet to receive light rays from said first prism, a fifth facet permitting the light rays to exits said second prism, and a sixth facet positioned to reflect light rays received form the fourth facet toward the fifth facet and direct the axial light ray to intersect the surface at a substantially fixed point when the apparatus is rotated into different positions.

13. The apparatus as recited in claim 12 wherein a light ray entering the first facet along the axis will exit perpendicularly through the fifth facet.

14. The apparatus as recited in claim 12 wherein sixth facet is not intersected by the axis and is positioned to reflect the light rays toward the axis.

15. The apparatus as recited in claim 12 wherein a region on the second facet where the light rays travel-ling from the first facet strike overlaps another region on the second facet where the light rays strike after being reflected by the third facet.

16. In a microfilm image projection system which selectively projects an image onto a screen for display to a user and onto a printing apparatus, an assembly to rotate an image formed by a plurality of light rays having a axial ray, said assembly comprising:

a firs prism having a transparent first facet through which the light rays enter with the axial light ray entering the first facet along an axis of rotation, a transparent second facet at an angle with respect to the first facet such that the light rays strike the second facet at angles of incidence which are at least equal to the critical angle, and a third facet reflecting substantially all light rays of the image received for the second facet internally toward the second facet so that the light rays strike the second facet at angles of incidence that are less than the critical angel and exit said first prism;

a second prism having a fourth facet intersecting the axis of rotation and spaced from the second facet to receive light rays form said first prism, a fifth facet permitting the light rays to exit said second prism, and a sixth facet positioned to reflect light rays received form the fourth facet toward the fifth facet and direct the axial light ray to intersect one of the the screen and the printing apparatus at a substantially fixed point when the assembly is rotated into different positions, and means for rotating said first and second prisms in unison about the axis of rotation to produce two orthogonal projections of a microfilm image.

17. The assembly as recited in claim 16 wherein said ultimate means rotates said first and second prisms forty-five degrees to produce the two orthogonal projections.

18. The assembly as recited in claim 16 wherein the fifth facet of said second prism is positioned so that the axial light ray passes perpendicularly through the fifth facet.

19. The assembly as recited in claim 16 wherein said means for rotating projects a microfilm image at one of the orthogonal projections for display to a user and at the other orthogonal projection for printing a copy of the microfilm image.

20. The assembly as recited in claim 16 wherein the light rays diverge within the assembly by an amount such that a focal length of the projections system is substantially the same with and without the assembly.

* * * * *

UNITED STATES PATENT AND TRADEMARK OFFICE
CERTIFICATE OF CORRECTION

PATENT NO. : 5,191,485

DATED : March 2, 1993

INVENTOR(S) : Todd A. Kahle

It is certified that error appears in the above-identified patent and that said Letters Patent is hereby corrected as shown below:

In column 9, at line 30, change "refection" to --reflecting--.

In column 9, at line 35, change "angel" to --angle--.

In column 9, at line 39, change "exits" to --exit--.

In column 9, at line 41, change "form" to --from--.

In column 10, at line 9, change "firs" to --first--.

In column 10, at line 20, change "angel" to --angle--.

In column 10, at line 23, change "form" to --from--.

In column 10, at line 27, change "form" to --from--.

In column 10, at line 50, change "projections" to --projection--.

Signed and Sealed this

Thirtieth Day of November, 1993

Attest:

BRUCE LEHMAN

*Attesting Officer*　　　*Commissioner of Patents and Trademarks*